Figure 1:
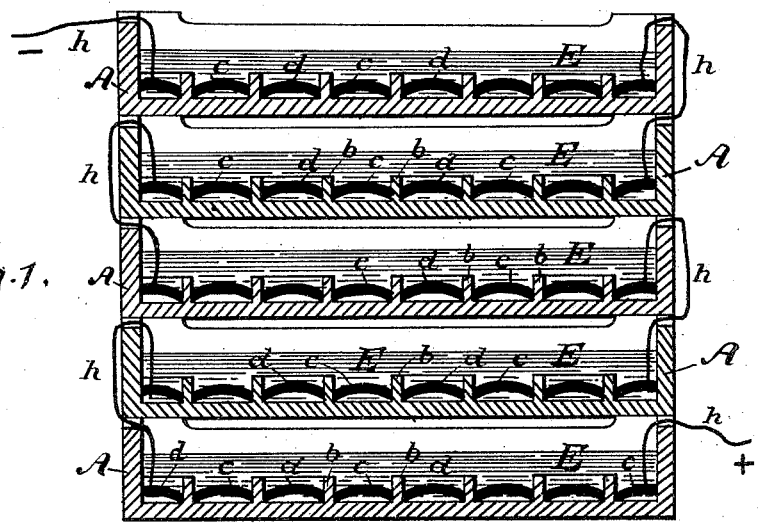

(No Model.) 2 Sheets—Sheet 1.

A. DE KHOTINSKY.
PRIMARY AND SECONDARY VOLTAIC BATTERY.

No. 302,623. Patented July 29, 1884.

Attest:
René Geerhaar
E. Leibnischyut

Inventor:
Achilles de Khotinsky
by Brackenbury & Co. attys (No Model.) 2 Sheets—Sheet 2.
A. DE KHOTINSKY.
PRIMARY AND SECONDARY VOLTAIC BATTERY.
No. 302,623. Patented July 29, 1884.
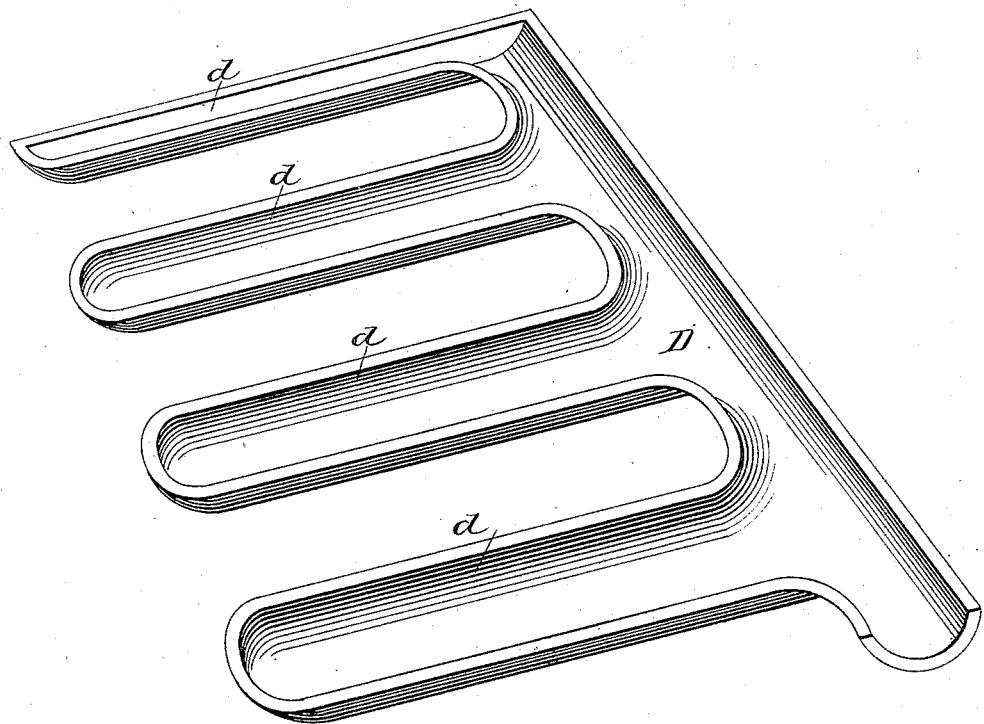

UNITED STATES PATENT OFFICE.

ACHILLES DE KHOTINSKY, OF ROTTERDAM, NETHERLANDS.

PRIMARY AND SECONDARY VOLTAIC BATTERY.

SPECIFICATION forming part of Letters Patent No. 302,623, dated July 29, 1884.

Application filed February 25, 1884. (No model.)

*To all whom it may concern:*

Be it known that I, ACHILLES DE KHOTINSKY, a subject of the Emperor of Russia, and residing at Rotterdam, Netherlands, have invented new and useful Improvements in Primary and Secondary Voltaic Batteries, of which the following is a specification.

My invention relates to improvements in electrical batteries, and may be applied to those where electrodes of metal, carbon, or other suitable material are immersed in an electrolytic fluid.

My invention consists in giving to the single cells a shape well adapted for increasing the power of the pile without complicating its construction, and without necessitating much floor-space for placing the same when several cells are combined with each other to form one battery. The cells of my piles are constructed with shallow vessels or troughs of wood, hard rubber, vulcanite, glass, porcelain, or any other non-conducting material, said troughs being divided by zigzag-shaped partition-walls into portions or compartments. The whole floor-space of said compartments is covered by correspondingly-shaped plates, forming the electrodes, and the whole vessel or trough is filled with an electrolytic fluid, so that said fluid submerges the partition-wall and forms the connecting medium between the electrode in each compartment. By the particular shape of the partition-wall spaces in each compartment will be created, which reach into and between the corresponding spaces of the other compartment, and as the plates forming the electrodes cover the whole floor-space of the compartments, and as said plates are of a corresponding shape, a series of tongues will project from each plate into and between the tongues of the other plate, the tongues of one plate being separated from the tongues of the other plate by the partition-walls, but being connected by the electrolytic fluid. The plates forming the electrodes are made to touch the floor only at their edges. The inner portion of the plate and of the tongues are made convex, so as not to touch the floor. This particular construction of the plates of the electrodes, and the particular arrangement of the two compartments, highly increases the efficiency of the pile, and is easily applied either to primary or secondary batteries. The plates forming the electrodes may be made either of lead or carbon, and may be overlaid either both with "formed" lead, or also with an oxide or peroxide of lead, or only one plate is overlaid with formed lead, while the other is overlaid with oxide or peroxide of lead. Instead of making both plates of lead or carbon, the negative plate, if a secondary battery is desired, and the positive plate, if a primary battery is desired, may be made of zinc. The cells may also be made by filling the two compartments either partly or entirely with mercury, using as electrolytic fluid chloride of ammonium, or sulphate of magnesium, or other suitable chemicals. The cells may also be made by using mercury in one compartment and zinc in the other, or, in general, by using any combination of chemicals used in secondary and primary batteries. The wire conductors, or the poles of my improved battery, are in each cell at one end of one compartment, and at the opposite end of the other compartment, and are soldered or otherwise connected to the plates forming the electrodes. In order to combine several cells so as to form one battery, the shallow troughs are placed one above the other, so that the pole ends come to be above each other, and the cells are connected either in series or in multiple arc.

Figure 2:
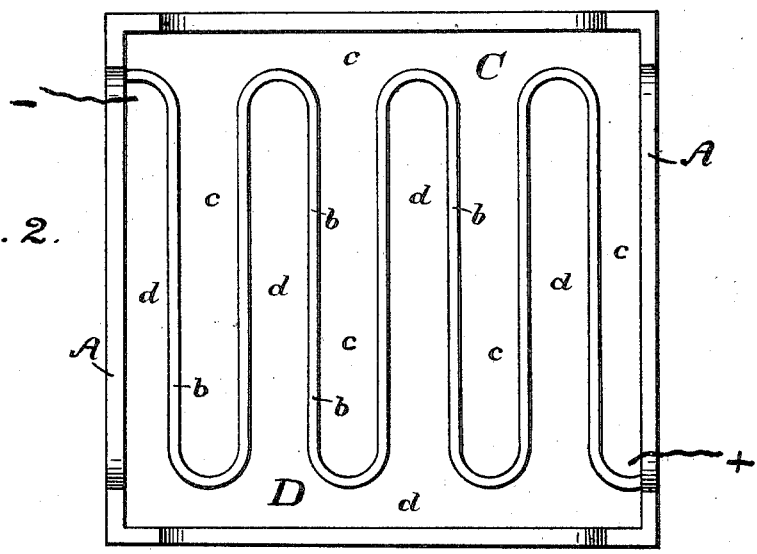

In the drawings accompanying this specification, Figure 1 represents a vertical section through a set of five cells connected in series. Fig. 2 represents the plan of the same. Fig. 3 is a perspective of one electrode, seen from the under side.

Similar letters of reference indicate corresponding parts.

A represents a trough or box of square shape, constructed of wood, glass, porcelain, vulcanite, hard rubber, or similar non-conducting material, said trough being divided by the low partition-wall $b$ into two compartments, C and D. Partition-wall $b$ has the shape of a zigzag, serpentine, or also of a broken line, so that in each compartment narrow spaces are created, which reach into and between the spaces of the other compartment. The floor-space of the compartments is covered by the electrodes $c$ and $d$, $c$ and $d$ being plates provided with a series of tongues or interlocking fingers corresponding to the spaces of the compartments, said plates being made convex in their middle portion, as seen in Fig. 1, and being submerged together with the partition-walls in the electrolytic fluid E.

$h$ represents the wire conductors, being soldered to the opposite ends of each plate.

The object of having the interlocking fingers made convex is to increase the surface of the electrodes, and to avoid that the lower and concave surfaces come to rest within the depositing slime, and are made inactive.

I do not lay any claim to the chemical combination of the battery; but

What I claim as new, and want to secure by Letters Patent, is—

1. In electrical batteries, a cell constructed with a shallow vessel, divided by a low partition-wall into two compartments, the floor-space of said compartments covered with convex plates forming the electrodes, the electrolytical fluid standing above the partition-wall submerging the electrodes, the poles of the cells at opposite ends of the compartments, substantially as shown and described.

2. In electrical batteries, a cell constructed with a shallow vessel, said vessel divided by a low zigzag-shaped partition-wall into compartments, the floor-space of which being covered by the plates forming the electrodes, and the electrolytical fluid reaching above the partition-walls, substantially as shown and described.

In testimony whereof I have signed my name to this specification in the presence of two subscribing witnesses.

ACHILLES DE KHOTINSKY.

Witnesses:
 L. KORT, Jr.,
 H. M. VEENHINS.